March 14, 1967 D. FIELDS 3,309,492
HIGH AMPERE MACHINE WELDING TORCH
Filed Dec. 30, 1963 2 Sheets-Sheet 1
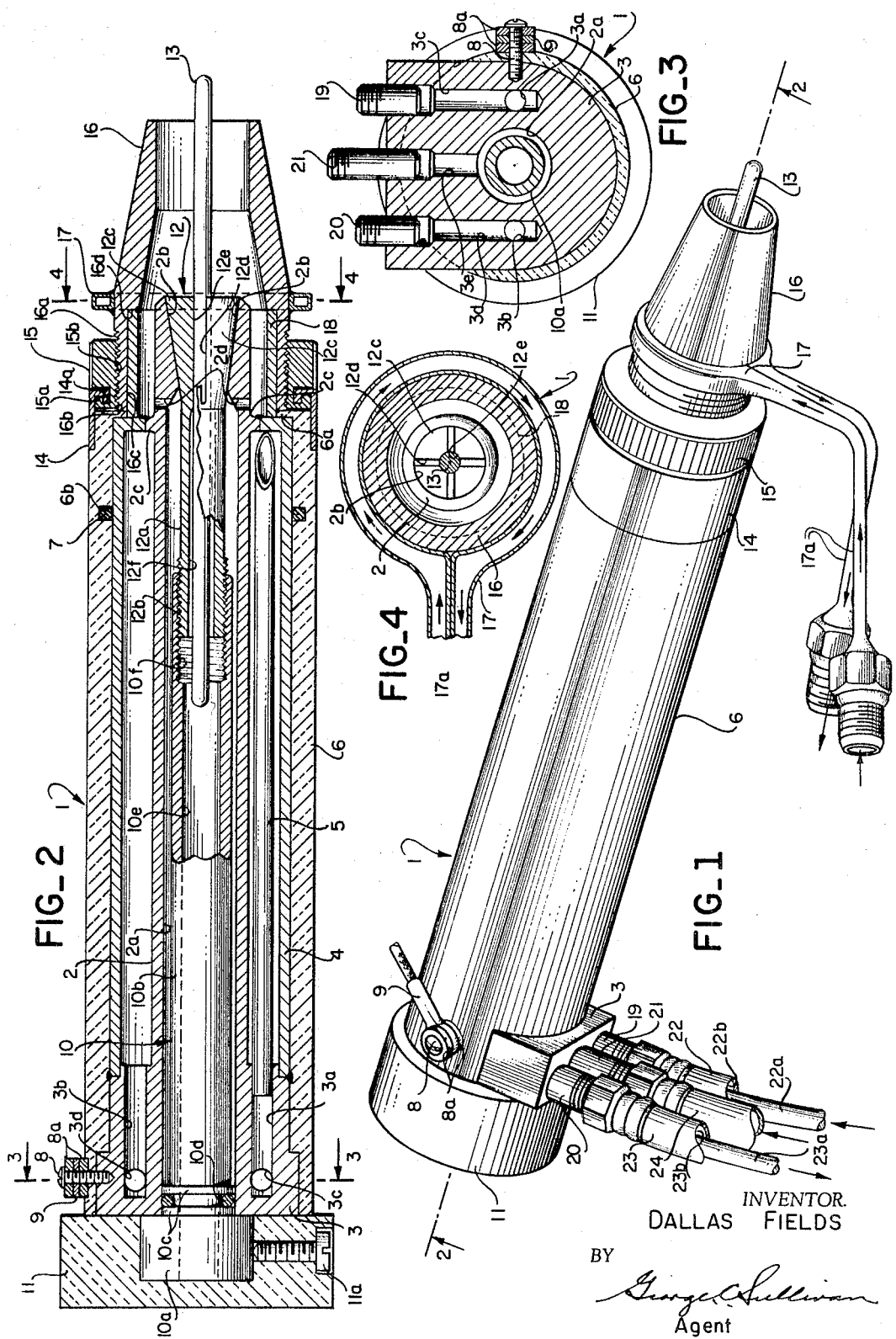
INVENTOR.
DALLAS FIELDS
BY
George A. Sullivan
Agent March 14, 1967  D. FIELDS  3,309,492
HIGH AMPERE MACHINE WELDING TORCH
Filed Dec. 30, 1963  2 Sheets-Sheet 2

INVENTOR.
DALLAS FIELDS
BY
George Sullivan
Agent

United States Patent Office 3,309,492
Patented Mar. 14, 1967

3,309,492
HIGH AMPERE MACHINE WELDING TORCH
Dallas Fields, Smyrna, Ga., assignor to Lockheed
Aircraft Corporation, Burbank, Calif.
Filed Dec. 30, 1963, Ser. No. 334,340
8 Claims. (Cl. 219—75)

This invention relates to an arc welding torch and more particularly, to a heavy duty machine arc welding torch capable of continuous operation with electric current in the order of 1,000 amperes being employed.

With the advent of the Space Age, a substantial number of new metals which are stronger and more durable than those previously known have been developed for use in applications where high structural strength and integrity is required. To optimize the structural properties of these metals and other more conventional metals, there has arisen a need for improved welding equipment with which these metals can be repeatedly welded to a high degree of perfection with high current levels. This invention solves this need by providing a welding torch capable of continuous operation with electric current levels up to in the order of 1,000 amperes, has high repeatability [a negligible millivoltage change when the electrode is changed], is leak free, and has high conductivity both internally and externally.

Accordingly, it is an object of this invention to provide a welding torch capable of continuous operation at amperage levels up to the order of 1,000 amperes.

Another object of this invention is to provide a welding torch having a minimum power loss between the torch and power supply source.

Yet another object of this invention is to provide an inert gas shielded welding torch wherein the cooling fluid is positively prevented from mixing with the shielding gas.

A further object of this invention is to provide a welding torch having a high degree of conductivity between the elements of the torch permitting repeatability of welds.

A still further object of this invention is to provide a welding torch wherein both the torch body and nozzle are fluid cooled.

Another object of this invention is to provide a welding torch having a collet which is drawn into firm metal to metal contact with an electrode mounted therethrough by coaction of the tapered head of the collet with a complementary bearing surface on the welding torch body.

Still another object of this invention is to provide a welding torch wherein silver plating is employed on the torch to decrease the internal resistance of the torch.

Other objects and advantages will become apparent from the following description taken in connection with the accompanying drawings in which:

FIGURE 1 is a pictorial view of one embodiment of the welding torch of this invention;

FIGURE 2 is a side view, partially in section, of the welding torch of FIGURE 1 taken along line 2—2 of FIGURE 1;

FIGURE 3 is a full sectional view of the welding torch of FIGURE 1 taken along the reference line 3—3 shown in FIGURE 2;

FIGURE 4 is a full sectional view of the welding torch of FIGURE 1 taken along the reference line 4—4 shown in FIGURE 2; and, FIGURE 5 is a partially sectional side view, similar to that of FIGURE 2, of an alternate embodiment of the welding torch of FIGURES 1 to 4.

Figure 5:
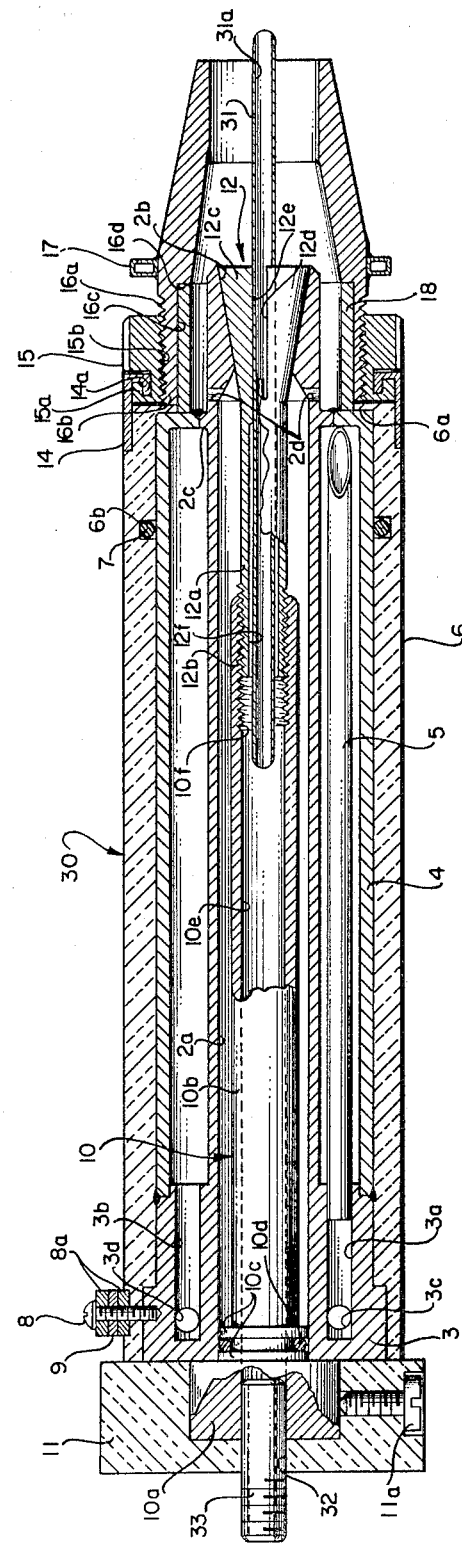

Generally stated, this invention comprises a heavy duty welding torch capable of operation at an electric current level in the order of 1,000 amperes, which is leak-free and has a high repeatability. This is made possible, at a minimum expense, by providing the torch with a cooling chamber in surrounding relation to the welding torch, and by connecting dual cooling fluid and power supply conduits to the inlet and return of the cooling chamber. Further, since cooling fluid leakage must be eliminated if quality welds are to be obtained, the jacket which forms the cooling chamber with the torch body is brazed at its connection points to the torch body. Additionally, to provide maximum conductivity through the torch with a minimum volage drop, the welding torch body is silver plated and a efficient collet, also silver plated, is provided which mounts the electrode in firm electrical and mechanical contact with the welding torch body. To further reduce heating of the welding torch, the torch nozzle is fluid cooled.

More specifically, the welding torch 1 shown in FIGURES 1 and 2 comprises a central body portion 2 having a central axial bore or passage 2a therethrough. Longitudinal bores or passages 3a and 3b are formed in the head 3 of the central body and bores or passages 3c and 3d laterally intersect the bores 3a and 3b, respectively, to form cooling fluid passages. For supplying inert gas to the axial passage 2a, a lateral bore or passage 3e (FIGURE 3) is formed in the head 3 intersecting the passage 2a. The passage 2a is substantially cylindrical throughout its length; however, its bottom end is provided with the frustro-conical bearing surface 2b which is widest at the free bottom end of the central body portion 2. Adjacent its bottom end, the central body 2 is provided with an external annular flange 2c and immediately beneath the flange 2c there are provided a plurality of radially directed gas ports 2d located circumferentially around the central body 2. Mounted in surrounding relation to the central body portion 2 is a jacket 4 which is brazed at its bottom end to the annular flange 2c and brazed at its top end to the head 3 to form a cooling chamber with the central body portion 2. Central body 2 and jacket 4 may be said to form the main torch body. The main torch body thus formed is coated with silver, as by dipping in a silver plating solution for example, to give the welding torch maximum conductivity.

In the cooling chamber formed by the jacket 4, there is provided a mixing tube 5 which extends substantially the length of the cooling chamber. To decrease the cost of manufacture, the top end of the mixing tube 5 is press fit into the bore 3a, which serves as a cooling fluid inlet, and the bottom end rests on the bottom wall of the water jacket. The mixing tube 5 causes the cooling fluid to be introduced at the bottom of the cooling chamber and spaces the cooling fluid inlet 3a from the outlet 3b, thereby assuring circulatory cooling of the central body 2.

To electrically insulate the main welding torch body, a cover 6 made of a high frequency electrical insulating material, preferably nylon, having an inwardly directed annular flange 6a on its bottom end and an internal annular groove 6b with an O-ring seal 7 fitted therein, is snugly fit in surrounding relation to the welding torch body. The O-ring seal 7 prevents the cover 6 from slipping and also serves the purpose of assuring that no atmospheric air is drawn into the welding cup between the torch body and the cover. Helping to hold the cover 6 in place is a screw 8 which fits through a hole in the cover 6 and is threadably secured in the head end 3 of the body. Two nuts 8a are threadably mounted on the screw 8 so that an electrical lead 9 may be placed in positive electrical contact with the torch body 2 to provide an electrical pickup for automatic arc length control for the welding torch.

Additionally included in the welding torch is a tubular draw bar 10 having its head end 10a seated upon the top surface of the central body portion head 3 and its body portion 10b fitted into the axial passage 2a with clearance therebetween. Adjacent the draw bar head 10a, the body portion 10b of the draw bar is provided with spaced-apart annular flanges 10c which define a groove in which an O-ring seal 10d is mounted. Flanges 10c are in sliding fit engagement with the cylinder wall of passage 2a, and, together with O-ring seal 10d, provide an efficient gas-tight seal for the top end of the passage 2a. An axial passage or bore 10e is preferably formed through the draw bar 10 which is provided with screw threads 10f at its bottom end. To prevent leakage of atmospheric air through the passage 10e, a cap 11 is press fit on to the draw bar head 10. Also, a set screw 11a is threadably mounted in the cap 11 in cooperating engagement with the draw bar head 10a to further assure a tight seal between the cap 11 and the draw bar head 10a.

The welding torch further includes a collet 12 having a stem 12a which is provided with external screw threads 12b, and a frusto-conical head 12c which is tapered to be of complementary configuration to that of the frusto-conical bearing surface 2b. A plurality of longitudinal slits 12d extend the length of the collet head 12c, and preferably a short distance beyond into the stem 12a of the collet, forming gripping fingers of the collet head. Also, a bore 12e is formed through the collet head 12c and a counter bore 12f is formed through the collet stem 12a. A non-consumable electrode 13 is fitted through the collet with the electrode being in sliding fit relation with respect to the bore 12e.

To fix the electrode 13 in place, the draw bar 10 is rotated to draw the entire tapered collet head 12c into firm metal to metal contact with the central body bearing surface 2b depressing the entire length of the tapered collet head 12c into firm metal to metal contact with the electrode 13. This places a large collet area in firm electrical and mechanical contact with the electrode 13 through the central body bearing surface 2b permitting conduction of electricity from the welding torch body to the electrode 13 with a minimum voltage drop. It should be particularly noted that the bore 12e in collet 12 is made slightly oversize with respect to the electrode 13 and the collet head 12c is tapered at a small angle, preferably in excess of seven degrees to prevent binding of the collet in the bearing surface 2b, to assure metal to metal contact between the collet head 12c and electrode 13 as well as between the collet head 12c and the central body bearing surface 2b. To enhance the repeatability of quality welds by reducing electrical losses within the welding torch and by providing a well-defined path for current flow, the collet stem 12a is provided with the counter bore 12f so that only the collet head will be in firm electrical contact with the electrode 13. Also, the draw bar 10 is constructed of a material having a low conductivity, such as stainless steel, while the collet 12 is constructed of a material having a high conductivity, such as copper, and is additionally silver plated. This construction assures that each time the welding torch is placed into operation current flows through the silver plated welding torch body, the central body bearing surface 2b, and the collet head 12c to the electrode 13.

Shrunk fit onto the bottom end of cover 6 is an annular bracket 14 having a radially inwardly and upwardly directed flange 14a. The complementary flange 15a on the draw nut 15 is cooperatingly engaged with the flange 14a so that the draw nut is free to rotate without axial movement. The draw nut 15 is provided with internal screw threads 15b which threadably engage the external screw threads 16a on the butt end 16b of the welding nozzle 16. Also, the welding nozzle 16 is provided with an annular jacket 17 having inlet and outlet fittings 17a (FIGURE 1) extending therefrom by which the cooling chamber formed by the jacket may be connected to a source of cooling fluid, preferably water. To provide good thermal conductivity between the welding nozzle 16 and the jacket 17, the jacket is mounted in sliding fit relation on the welding nozzle and is brazed in place.

A hollow thermally and electrically non-conductive shield 18 is mounted in the counter bore 16c formed in the butt end of the welding nozzle. Thus, when the draw nut 15 has been rotated to tighten the welding nozzle 16 in place, the butt end 16b of the welding nozzle is in snug sealing engagement with the cover flange 6a, and the shield 18 is held snugly in place between the annular seat 16d formed in the nozzle by the counter bore and the bottom end of the welding torch body 4 immediately interiorly of the cover flange 6a.

For connecting the welding torch 1 to power, cooling fluid, and shielding gas (FIGURE 1), the connector fittings 19, 20 and 21 are threadably secured to the lateral passages 3c, 3d and 3e, respectively. Connector fittings 19 and 20 are threadably connected to the combination power supply and cooling fluid conduits 22 and 23 which carry electrical power through their central copper power conductors or cables 22a and 23a, and carry cooling fluid through their central copper power conductors or cables 22a and 23a, and carry cooling fluid through their annuli 22b and 23b. On the other hand, the connector fitting 21 is threadably connected to the inert gas supply conduit 24 which in turn is connected through a gas flow regulating valve (not shown) to a source of inert shielding gas. Although the conduits 22 and 23 are commercially available, it is important to note that applicant's provision of two combination power supply and cooling fluid conduits provides a substantially greater current carrying capacity between the power supply source and the welding torch than the single combination power and water supply conduit used on prior art welding torches. Thus, the provision of two combination power supply and cooling fluid conduits effectively and efficiently eliminates the possibility of torch failure due to burning out of the power supply conductors 22a and 23a when the torch is operated at a high ampere level.

In operation of the torch, cooling fluid, preferably water, is first started flowing through annulus 22b of conduit 22, passages 3c and 3a, and mixing tube 5 into the water jacket where it is circulated around the central body portion 2 before being returned to reservoir through passages 3b and 3d, and annulus 23b of conduit 23. At this time, cooling fluid flow is also initiated in the jacket 17 surrounding nozzle 16, and inert shielding gas is supplied through conduit 24, passage 3e into central bore 2a, through gas ports 2d, and out the welding nozzle 16 in surrounding shielding relation to the electrode 13. Then electrical power is supplied to the torch through both of the conductors 22a and 23a with the current path being closed by initiation of an arc between the electrodes 13 and a work piece.

Referring now to FIGURE 5, therein shown is an alternate embodiment of the welding torch shown in FIGURES 1 to 4. Since these welding torches are substantially identical, the welding torch 30 of FIGURE 5 will only be described as to the manner in which it differs from the welding torch of FIGURES 1 to 4, and like reference numerals will be given to the identical parts of both the welding torches.

Specifically, the welding torch 30 of FIGURE 5 differs from the welding torch 1 of FIGURES 1 to 4 in that it is provided with a non-consumable tungsten electrode 31 having a bore 31a therethrough rather than a solid tungsten electrode, and a bore 32 is formed through cap 11 through which a connector fitting 33 is mounted. Thus, the axial passage 10e through draw bar 10 may be said to form an additional inert shielding gas passage which may be connected by connector fitting 33 through a gas flow regulating valve (not shown) to a source of inert shielding gas. Provision of the hollow electrode and its connection to an inert shielding gas supply permits the selective supply of inert shielding gas through the welding nozzle and/or the hollow electrode 31 is regulated quantities to obtain maximum shielding of the work piece. This makes possible the selection of the most effective use of inert shielding gas under a given set of welding conditions.

Summarizing, some of the important features of the welding torches of this invention are the provision of two water cooled power leads which will stand up under high currents, cooling of the main welding torch body by continuously circulating cooling fluid throughout the length of the water jacket, and a fluid cooled welding nozzle. Additionally, the silver plating of the welding torch body and the provision of an efficient collet having an enlarged collet area in firm engagement with both the electrode and the welding torch body minimizes electrical losses in the torch, minimizes resistance heating of the torch and permits repeatability of weld performance. Additionally, the invention provides for the regulated flow of inert shielding gas through the welding nozzle and/or a hollow non-consumable electrode thereby giving the operator maximum control over the welding conditions.

While particular embodiments of the invention have been illustrated and described, it will be obvious to those skilled in the art that various changes and modifications may be made without departing from the invention; and it is intended to cover in the appended claims all such modifications and equivalents as fall within the true spirit and scope of this invention.

What is claimed is:

1. In a welding torch:
a central body portion having a head end, a bottom end and an axial passage extending between said head end and said bottom end,
 said axial passage tapered at its bottom end to form a central body portion bearing surface;
a draw bar having a head end and an elongate body portion located with its elongate body portion received in said axial passage and its head end seated on the head end of said central body portion;
a collet having an axial bore therethrough and a longitudinally slitted, tapered end of complementary configuration to that of said central body bearing surface,
 said collet removably secured to said draw bar;
a non-consumable electrode located within the bore through said collet;
at least a portion of the collet bore proximate the tapered collet end drawn into firm engagement with said electrode by the coaction of the tapered collet end drawn into firm engagement with said central body bearing surface;
a welding nozzle having a butt end and a tip end mounted with its butt end confronting the bottom end of said central body portion;
 said collet and said central body portion being silver plated;
a jacket mounted in surrounding relation to said central body portion forming a cooling chamber between said jacket and said central body portion;
inlet and outlet passages connected to said cooling chamber passages; and
a combination power supply and cooling fluid conduit connected to each of said inlet and outlet passages.

2. In a welding torch:
a central body portion having a head end, a bottom end, and an axial passage extending between said head end and said bottom end,
 said axial passage tapered at its bottom end to form a central body bearing surface;
a gas inlet passage connected to said axial passage for communicating an inert gas supply therewith;
a jacket mounted in surrounding relation to said central body portion forming a cooling chamber between said central body and said jacket;
radial ports formed in said central body portion adjacent said central body bearing surface;
at least two passages connected to said cooling chamber for communicating said cooling chamber with cooling fluid supply and return;
a draw bar located in said axial passage;
a collet having an axial bore therethrough and a longitudinally slitted, tapered end of complementary configuration to that of said bearing surface;
a non-consumable electrode located within the bore through said collet,
 said collet interconnected to said draw bar, and said tapered collet end biased into engagement with said electrode by reaction with said central body bearing surface;
a tubular insulating cover having an inturned flange on its one end mounted in surrounding relation on said welding torch with said inturned flange seated on the bottom end of said jacket;
a threaded draw nut mounted for free rotation on the bottom end of said cover;
and a welding nozzle having a threaded butt end and a tip end,
 said welding nozzle mounted by said draw nut with its butt end seated on the inturned flange of said cover.

3. The welding torch of claim 2 wherein an annular groove is formed on the interior surface of said cover and a seal means is mounted therein.

4. The welding torch of claim 2 wherein an axial passage is formed through said draw bar; an axial passage is formed through said electrode; and a gas inlet passage is connected to said axial passage through said draw bar.

5. In a welding torch:
a central body portion having a head end, a bottom end, and an axial passage extending between said head end and said bottom end,
 said axial passage tapered at its bottom end to form a central body bearing surface;
a gas inlet passage connected to said axial passage for communicating an inert gas supply therewith;
a jacket mounted in surrounding relation to said central body portion forming a cooling chamber between said central body and said jacket;
inlet and outlet passages connected to said cooling chamber for communicating cooling fluid with said cooling chamber;
a draw bar having a head end and an elongate body portion threaded at its bottom end,
 said draw bar having its elongate body portion located in said axial passage with said draw bar head seated on the head end of said central body portion;
a seal means interposed between said draw bar and said central body portion;
a collet having an axial bore therethrough, a first longitudinally slitted, tapered end of complementary configuration to that of said bearing surface, and a second threaded end,
 said collet secured by its threaded end to said draw bar;
at least a portion of said tapered collet end defining said axial bore drawn into firm engagement with said electrode by coaction of the tapered collet end drawn into firm engagement with said central body bearing surface;
a non-consumable electrode located within the bore through said collet;
a threaded draw nut mounted for free rotation at the bottom end of said central body portion;
a welding nozzle having a threaded butt end and a tip end,
 said welding nozzle mounted by said draw nut at the bottom end of said central body portion;
a counter bore formed within the butt end of said welding nozzle;

and a tubular non-conductive heat shield mounted within said counter bore.

6. The welding torch of claim 5 including a cover of electrically insulating material having an inturned flange on its one end mounted in surrounding relation to said welding torch with the butt end of said welding nozzle seated on said annular cover flange.

7. A welding torch comprising:
   a central body portion having a head end, a bottom end and an axial passage extending between said head end and said bottom end,
      said axial passage tapered at its bottom end to form a central body bearing surface;
   a gas inlet passage connected to said axial passage for communicating an inert gas supply with said axial passage;
   a jacket mounted in surrounding relation to said central body portion forming a cooling chamber between said central body and said jacket;
   radial ports in said central body adjacent said central body bearing portion;
   at least two passages connected to said cooling chamber for communicating said cooling chamber with cooling fluid supply and return;
   an elongate mixing tube mounted in said cooling chamber and connected to one of said passages;
   a draw bar having a head end, an elongate body portion threaded at its bottom end, two spaced-apart annular flanges intermediate said elongate body portion, and an O-ring seal fitted between said annular flanges,
      said draw bar elongate body portion located in said axial passage with said O-ring seal in sealing engagement with said passage and said draw bar head seated on the head end of said central body portion;
   a collet having an axial bore therethrough, a first longitudinally slitted, tapered end of complementary configuration to that of said central body portion bearing surface, and a second threaded end,
      said collet secured by its threaded end to said draw bar;
   a non-consumable electrode located within the bore through said collet,
      said tapered collet end drawn into firm seated engagement with said central body bearing surface by said draw bar thereby drawing the tapered end of said collet into firm engagement with said electrode;
   a tubular insulating cover having an inturned flange on its one end, an annular groove formed in the interior surface of said cover, and an O-ring seal mounted in said groove,
      said cover mounted in surrounding relation on said jacket with said O-ring seal in sealing engagement with said jacket and said inturned flange seated on the bottom end of said jacket;
   a threaded draw nut mounted for free rotation on the bottom end of cover;
   a welding nozzle having a threaded butt end and a tip end,
      said welding nozzle mounted by said draw nut with the butt end of said welding nozzle seated on the inturned flange of said cover;
   and a cooling fluid jacket having inlet and outlet fittings mounted in surrounding relation to said welding nozzle.

8. In a welding torch, the combination comprising:
   a central body portion having a head end, a bottom end and an axial passage extending between said head end and said bottom end,
      said axial passage being tapered at its bottom end to form a central body bearing surface;
   a first gas inlet passage connected to said axial passage for communicating an inert gas supply therewith;
   a jacket mounted in surrounding relation to said central body portion to form a cooling chamber between said central body portion and said jacket;
   inlet and outlet passages connected to said cooling chamber for communicating said cooling chamber with cooling fluid supply and return;
   a draw bar having a head end and an elongate body portion located with its elongate body portion rotatably received in said axial passage and its head end rotatably seated on the head end of said central body portion;
   an axial passage through said draw bar;
   a second gas inlet passage extending through said head end of said draw bar and communicating with said axial passage through said draw bar;
   seal means interposed between said draw bar and said central body portion;
   a collet having an axial bore therethrough, a first tapered end of complementary configuration to that of said central body bearing surface, and a second threaded end,
      said collet secured by its threaded end to said draw bar;
   longitudinal slits formed in said tapered collet end;
   a non-consumable hollow electrode located within said bore through said collet,
      said non-consumable electrode having an axial passage therethrough;
   at least a portion of the collet bore proximate the tapered end drawn into firm engagement with said electrode by the coaction of the tapered collet end drawn into firm engagement with said central body bearing surface; and
   a welding nozzle having a butt end and a tip end mounted with its butt end at the bottom end of said central body portion.

References Cited by the Examiner

UNITED STATES PATENTS

| | | | |
|---|---|---|---|
| 2,346,088 | 4/1944 | Shobert | 219—119 |
| 2,547,872 | 4/1951 | Kissick | 219—75 |
| 2,863,983 | 12/1958 | Kane et al. | 219—75 |
| 2,903,560 | 9/1959 | Barfuss et al. | 219—75 |
| 2,914,652 | 11/1959 | Hall et al. | 219—120 |
| 3,130,292 | 4/1964 | Gage et al. | 219—75 |

JOSEPH V. TRUHE, *Primary Examiner.*